(12) United States Patent
Tanabe

(10) Patent No.: US 8,128,140 B2
(45) Date of Patent: Mar. 6, 2012

(54) COLLISION DETECTING DEVICE

(75) Inventor: Takatoshi Tanabe, Ichinomiya (JP)

(73) Assignee: Denso Corporation, Kariya (JP)

( * ) Notice: Subject to any disclaimer, the term of this patent is extended or adjusted under 35 U.S.C. 154(b) by 196 days.

(21) Appl. No.: 12/218,483

(22) Filed: Jul. 15, 2008

(65) Prior Publication Data

US 2009/0021030 A1 Jan. 22, 2009

(30) Foreign Application Priority Data

Jul. 17, 2007 (JP) ................................. 2007-186217

(51) Int. Cl.
*B60R 19/48* (2006.01)
*B60R 19/03* (2006.01)

(52) U.S. Cl. ........ 293/117; 293/121; 293/4; 296/187.04

(58) Field of Classification Search ............... 293/1, 2, 293/4, 117, 120, 121; 180/271–289; 296/187.04, 296/187.09
See application file for complete search history.

(56) References Cited

U.S. PATENT DOCUMENTS

| | | | |
|---|---|---|---|
| 6,561,301 B1 * | 5/2003 | Hattori et al. ................ | 180/274 |
| 2005/0116817 A1 | 6/2005 | Mattes et al. | |
| 2006/0087417 A1 | 4/2006 | Kiribayashi | |
| 2006/0103514 A1 | 5/2006 | Hosokawa | |
| 2007/0114771 A1 * | 5/2007 | Wanami et al. ............ | 280/735 |
| 2007/0114803 A1 * | 5/2007 | Takahashi et al. ........... | 293/102 |
| 2007/0227797 A1 | 10/2007 | Takahashi et al. | |
| 2009/0064695 A1 | 3/2009 | Kojima | |

FOREIGN PATENT DOCUMENTS

| | | |
|---|---|---|
| EP | 1 578 647 | 7/2007 |
| JP | 11-310095 | 11/1999 |
| JP | 2005-053425 | 3/2005 |
| JP | 2006-512245 | 4/2006 |
| JP | 2006-117157 | 5/2006 |
| JP | 2006-298014 | 11/2006 |
| JP | 2006-298262 | 11/2006 |
| JP | 2007-137333 | 6/2007 |
| JP | 2007-290682 | 11/2007 |
| WO | WO 2004/058545 | 7/2004 |

OTHER PUBLICATIONS

Computer translation from JPO website for JP 2005-053425 to toyota.*
Office action dated Jun. 4, 2009 in corresponding Japanese Application No. 2007-186217.
U.S. Appl. No. 12/218,485, filed Jul. 15, 2008, Tanabe.
Office Action mailed on Sep. 21, 2010 in the corresponding Japanese Patent Application No. 2007-186217 (with English translation).

* cited by examiner

*Primary Examiner* — Glenn Dayoan
*Assistant Examiner* — Melissa A Black
(74) *Attorney, Agent, or Firm* — Harness, Dickey & Pierce, PLC

(57) ABSTRACT

A collision detecting device includes a chamber member providing a space, a pressure sensor for detecting a pressure inside the space, a determination means, a bumper absorber for absorbing an impact generated by collision and a temperature sensor for detecting a temperature of the chamber member. Hardness of the chamber member changes with temperature. Thus, the deformation degree of the chamber member is different depending on temperature. However, the determination means corrects the pressure detected by the pressure sensor based on the temperature detected by the temperature sensor, and determines collision based on the corrected pressure. Therefore, a collision detecting device which can determine collision of an object with a vehicle accurately without being affected by the change of temperature can be obtained.

17 Claims, 4 Drawing Sheets

FRONT ←——→ REAR

FRONT ←→ REAR

US 8,128,140 B2

COLLISION DETECTING DEVICE

CROSS REFERENCE TO RELATED APPLICATION

This application is based on Japanese Patent Application No. 2007-186217 filed on Jul. 17, 2007, the disclosure of which is incorporated herein by reference.

FIELD OF THE INVENTION

The present invention relates to a collision detecting device for detecting collision of a pedestrian or the like with a vehicle.

BACKGROUND OF THE INVENTION

The conventional obstacle determination device for vehicles is disclosed in JP-A-2006-117157 corresponding to U.S. 2006/0087417 A1 as a pedestrian collision detecting device for detecting collision of a pedestrian or the like with a vehicle. The obstacle determination device includes an absorber, a pressure sensor, a velocity sensor and an airbag ECU device. The absorber is a member for absorbing an impact generated by collision of an object with a vehicle. The absorber includes a chamber member and a connection member. The chamber member is attached to a front surface of a bumper reinforcement by the connection member. Air is filled in a chamber which is provided by the chamber member. The pressure sensor detects a pressure inside the chamber. The pressure sensor is connected to the connection member through a tube. The velocity sensor is a sensor for detecting a velocity of the vehicle and arranged inside the vehicle. The pressure sensor and the velocity sensor are connected to the airbag ECU. The airbag ECU determines based on detecting results of the pressure sensor and the velocity sensor whether collision with a bumper of the vehicle is caused by a pedestrian. Specifically, the airbag ECU determines whether the pressure in the chamber exceeds a threshold value determined by a running velocity of the vehicle.

The chamber member which provides the absorber may be made of resin. The absorber and the chamber member may be made separately, and both may be made of resin. Hardness of resin changes with temperature. The resin becomes soft at high temperature and hard at low temperature. Thus, when the same obstacle collides with the vehicle under the same condition, the deformation degree is different depending on temperature. Hereby, a detection result of the pressure sensor changes. The pressure becomes high at high temperature and low at low temperature. Therefore, when temperature changes significantly, it is difficult to determine accurately whether the collided obstacle is a pedestrian.

SUMMARY OF THE INVENTION

It is an object of the present disclosure to provide a collision detecting device which can determine collision of an object with a vehicle accurately without being affected by the change of temperature.

According to a first aspect of the present disclosure, a collision detecting device for a vehicle comprising: a chamber member providing a space; a pressure sensor for detecting a pressure inside the space, and connected to the chamber member; a determination means for determining collision of an object with the vehicle based on the pressure of the space detected by the pressure sensor; a bumper absorber for absorbing an impact generated by the collision; and a temperature sensor disposed around the chamber member or the bumper absorber to detect a temperature thereof. The determination means corrects the detected pressure based on the temperature detected by the temperature sensor so as to be decreased when the detected temperature is higher than a predetermined upper limit temperature and so as to be increased when the detected temperature is lower than a predetermined lower limit temperature. The collision is determined based on the corrected pressure.

Hereby, a collision detecting device which can determine collision of an object with a vehicle accurately without being affected by the change of temperature can be obtained.

According to a second aspect of the present disclosure, a collision detecting device for a vehicle comprising: a chamber member providing a space; a pressure sensor for detecting a pressure inside the space, and connected to the chamber member; a determination means for determining collision of an object with the vehicle based on the pressure of the space detected by the pressure sensor; a bumper absorber for absorbing an impact generated by the collision; and a temperature sensor disposed around the chamber member or the absorber to detect a temperature thereof. The determination means performs calculation based on the detected pressure detected by the pressure sensor so that a calculated pressure is obtained. The determination means corrects a threshold pressure based on the detected temperature detected by the temperature sensor. The collision is determined based on a comparison between the calculated pressure and the corrected threshold pressure.

Hereby, a collision detecting device which can determine collision of an object with a vehicle accurately without being affected by the change of temperature can be obtained.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

It is noted that "a front side" indicates a front side with respect to a traveling direction of a vehicle and "a rear side" indicates a rear side with respect to a traveling direction of a vehicle. In addition, it is noted that the front-rear direction and the up-down direction in drawings indicate the front-rear direction of the vehicle and the up-down direction of the vehicle, respectively.

In the embodiments, an example that a collision detecting device is applied to a pedestrian collision detecting device for detecting collision of a pedestrian with a bumper in vehicles is shown.

First Embodiment

A structure of a pedestrian collision detecting device is described with reference to FIG. 1 and FIG. 2.

Figure 1:
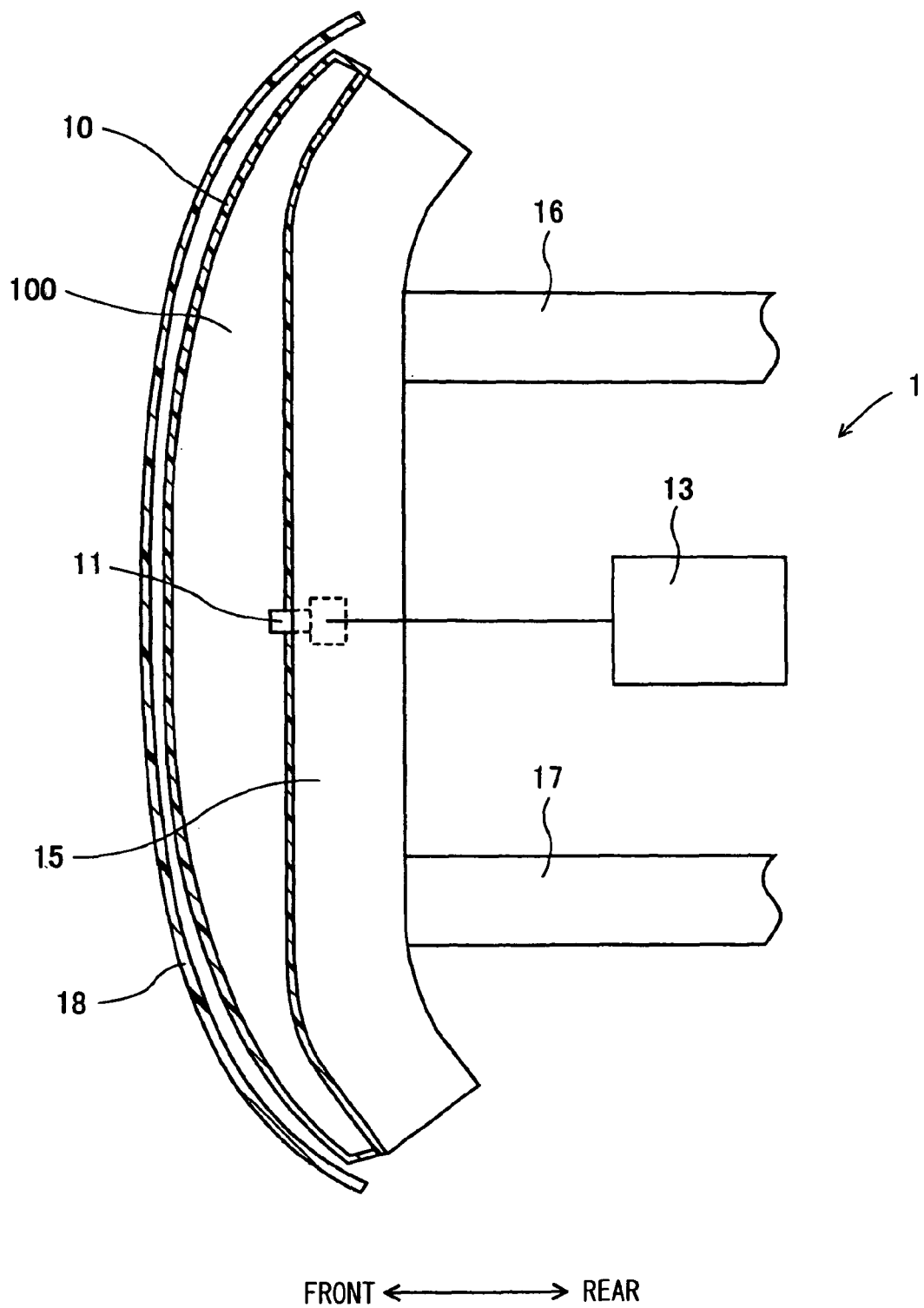
FIG. 1 is a view showing a pedestrian collision detecting device according to a first embodiment.
Figure 2:
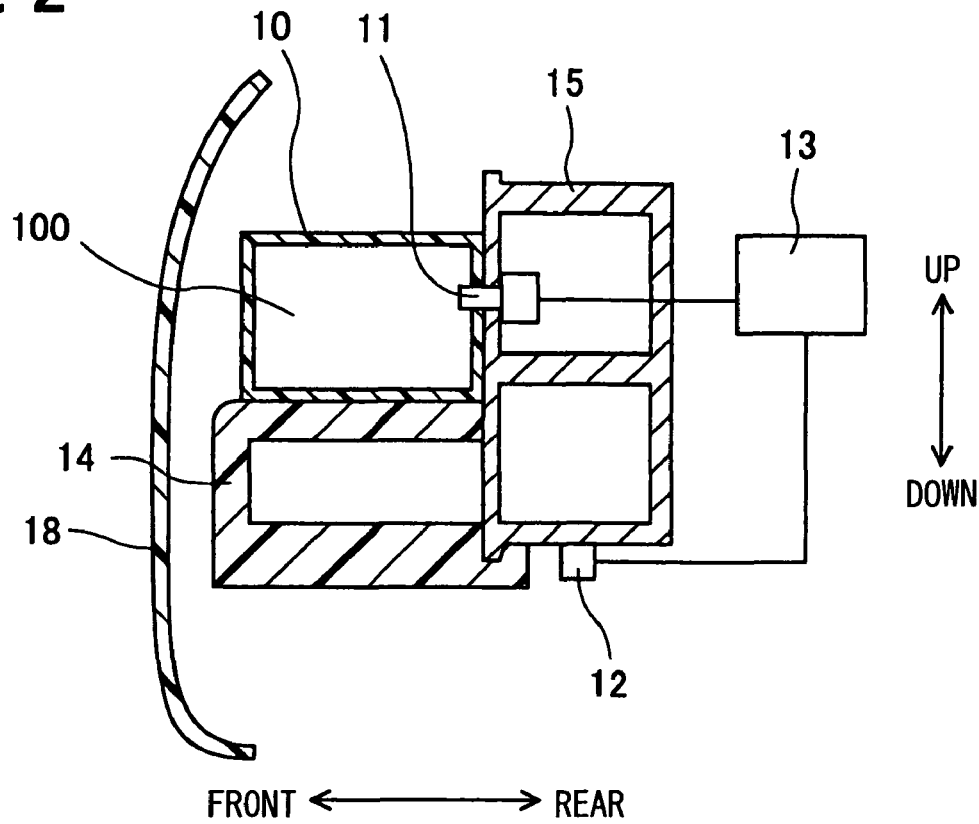
FIG. 2 is a cross sectional view showing a bumper reinforcement, a chamber member and a bumper absorber of the pedestrian collision detecting device according to the first embodiment.

As shown in FIGS. 1 and 2, a pedestrian collision detecting device 1 (a collision detecting device) includes a chamber member 10, a pressure sensor 11, a temperature sensor 12, a pedestrian collision determination portion 13 (a determination means) and a bumper absorber 14.

The chamber member 10 is an elongated sack-like member made of such as resin, which has a cross section of a square shape, and constitutes a chamber 100, which is a sealed space or a substantially sealed space. Air is filled in the chamber 100. The chamber member 10 is attached to an upside front surface of a bumper reinforcement 15 extending in a lateral direction of the vehicle, which has a cross section that substantially two squares are attached in line. The bumper reinforcement 15 is attached to front side end portions of a pair of side members 16 and 17, which extends in the front-rear direction of the vehicle and constitutes a frame of the vehicle.

The pressure sensor 11 is connected to the chamber member 10 and detects the pressure inside the chamber 100. The pressure sensor 11 is included inside the bumper reinforcement 15 and connected to the chamber member 10 with an end portion of the pressure sensor 11 protruded to the front side.

The temperature sensor 12 detects the temperature outside the vehicle. The temperature sensor 12 is attached to a periphery of the bumper absorber 14, in particular, a bottom surface of the bumper reinforcement 15.

The pedestrian collision determination portion 13 corrects the pressure detected by the pressure sensor 11 based on a detection result of the temperature sensor 12. In addition, the determination portion 13 determines based on the corrected pressure whether a collided object is a pedestrian and outputs a corresponding signal. Specifically, a maximum value of the pressure is calculated from the detected pressure, and then, the maximum value of the pressure is corrected based on the detected temperature. Moreover, the determination portion 13 determines based on a comparison between the corrected maximum value of the pressure and a maximum threshold pressure, which is set in advance, whether a collided object is a pedestrian. For example, the determination portion 13 is provided by a microcomputer. The determination portion 13 is arranged inside the vehicle and connected to the pressure sensor 11 and the temperature sensor 12, respectively.

The bumper absorber 14 is an elongated shape member made of resin and has a cross section of a concave shape. The bumper absorber 14 absorbs an impact generated by collision of an object with the vehicle. A top surface of the bumper absorber 14 is attached to a bottom surface of the chamber member 10, and the bumper absorber 14 is attached to a downside front surface of the bumper reinforcement 15. Dimension of the bumper absorber 14 in the front-rear direction is adjusted so that a front surface of the bumper absorber 14 is arranged at the front side of a front surface of the chamber member 10. An elongated plate-like bumper cover 18 made of such as resin is arranged at the front side of the chamber member 10 and the bumper absorber 14.

An operation of the pedestrian collision detecting device is described with reference to FIGS. 1 and 2.

Figure 3:
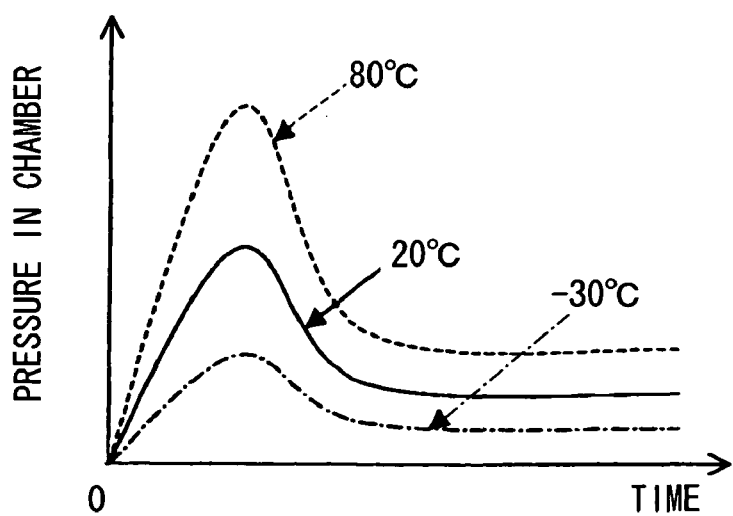
FIG. 3 is a graph showing a temperature property of a pressure inside a chamber.

Power source is applied to the device 1, the pressure sensor 11, the temperature sensor 12 and the determination portion 13 start to operate. When a pedestrian collides with the bumper cover 18, the bumper cover 18 deforms to the rear side and the bumper absorber 14 and the chamber member 10 deform. The bumper absorber 14 absorbs an impact generated by collision with the deformation thereof. The pressure inside the chamber 100 increases with the deformation. The pressure sensor 11 detects the pressure inside the chamber 100. The temperature sensor 12. detects the temperature at a periphery of the bumper absorber 14. As shown in FIG. 3, the pressure inside the chamber 100 detected by the pressure sensor 11 increases with the collision of the object with the vehicle and reaches a peak, and then, the pressure decreases as time passes and reaches a predetermined value. Since both the chamber member 10 and the bumper absorber 14 are made of resin, hardness thereof change with temperature. Thus, when the same object collides with the vehicle under same conditions other than temperature, the deformation degree of the chamber member 10 differs from the deformation degree of the bumper absorber 14. Therefore, the pressure in the chamber 100 changes with the temperature. Specifically, the pressure in the chamber 100 increases with increasing temperature.

The determination portion 13 reads the detection results of the pressure sensor 11 and the temperature sensor 12 and calculates a maximum value of the pressure from the detected pressure. In addition, the maximum value of the pressure is corrected based on the detected temperature in accordance with the predetermined calculating formula. Specifically, when the detected temperature is higher than the predetermined upper limit temperature, the calculated maximum value of the pressure is corrected so as to be decreased. On the other hand, when the detected temperature is lower than the predetermined lower limit temperature, the calculated maximum value of the pressure is corrected so as to be increased. The calculating formula is set based on an experimental data so that the maximum value of the pressure is corrected accurately with respect to the temperature. Moreover, the predetermined upper limit temperature is set to be a predetermined temperature higher than the ordinary temperature and the predetermined lower limit temperature is set to be a predetermined temperature lower than the ordinary temperature. The determination portion 13 determines based on a comparison between the corrected maximum value of the pressure and a maximum threshold pressure, which is set in advance, whether a pedestrian collides with the vehicle and outputs a corresponding signal. The maximum threshold pressure is set as an appropriate value which is distinguishable between a pedestrian and the other object.

The device 1 can correct the detected pressure based on temperature at the periphery of the bumper absorber 14 and determine based on the corrected pressure whether a collided object with the vehicle is a pedestrian. Since both the chamber member 10 and the bumper absorber 14 are made of resin, hardness thereof change with temperature. Thus, when the same object collides with the vehicle under the same condition, the deformation degree of the chamber member 10 differs from the deformation degree of the bumper absorber 14. Therefore, the detection result of the pressure sensor 11 changes. However, the device 1 can correct the detected pressure based on temperature and determine based on the corrected pressure. Therefore, whether a collided object with the vehicle is a pedestrian can be determined accurately without being affected by the change of temperature.

In addition, the detected maximum value of the pressure can be corrected so as to be decreased when the detected temperature is higher than the predetermined upper limit temperature, and the detected maximum value of the pressure can be corrected so as to be increased when the detected temperature is lower than the predetermined lower limit temperature. Since both the chamber member 10 and the bumper absorber 14 are made of resin, hardness thereof change with temperature. The resin becomes soft at high temperature and hard at low temperature. Thereby, the detection result of the pressure sensor 11 becomes high at high temperature and low at low temperature. However, the pressure can be corrected so as to be decreased when temperature is higher than the predetermined upper limit temperature, and the pressure can be corrected so as to be increased when temperature is lower than the predetermined lower limit temperature. Therefore, the pressure change affected by the temperature change can be suppressed.

The temperature sensor 12 is attached to a bottom surface of the bumper reinforcement 15. Thus, temperature at the periphery of the bumper absorber 14 as a reference of the correction can be detected accurately.

The first embodiment shows the example that the calculated maximum value of the pressure is corrected based on the detected temperature and the determination is performed based on the comparison between the corrected maximum value of the pressure and the maximum threshold pressure. The maximum threshold pressure may be corrected based on the detected temperature and the determination may be performed based on the comparison between the calculated maximum value of the pressure and the corrected maximum threshold pressure. In case that the calculated pressure becomes higher with increasing temperature, i.e., in case that the chamber member and the bumper absorber are made of material that becomes soft at high temperature and hard at low temperature, the threshold value may be corrected so as to be increased when the detected temperature is higher than the predetermined upper limit temperature, and the threshold value may be corrected so as to be decreased when the detected temperature is lower than the predetermined lower limit temperature. On the other hand, in case that the calculated pressure becomes higher with decreasing temperature, i.e., in case that the chamber member and the bumper absorber are made of material that becomes hard at high temperature and soft at low temperature, the threshold value may be corrected so as to be decreased when the detected temperature is higher than the predetermined upper limit temperature, and the threshold value may be corrected so as to be increased when the detected temperature is higher than the predetermined lower limit temperature.

Figure 4:
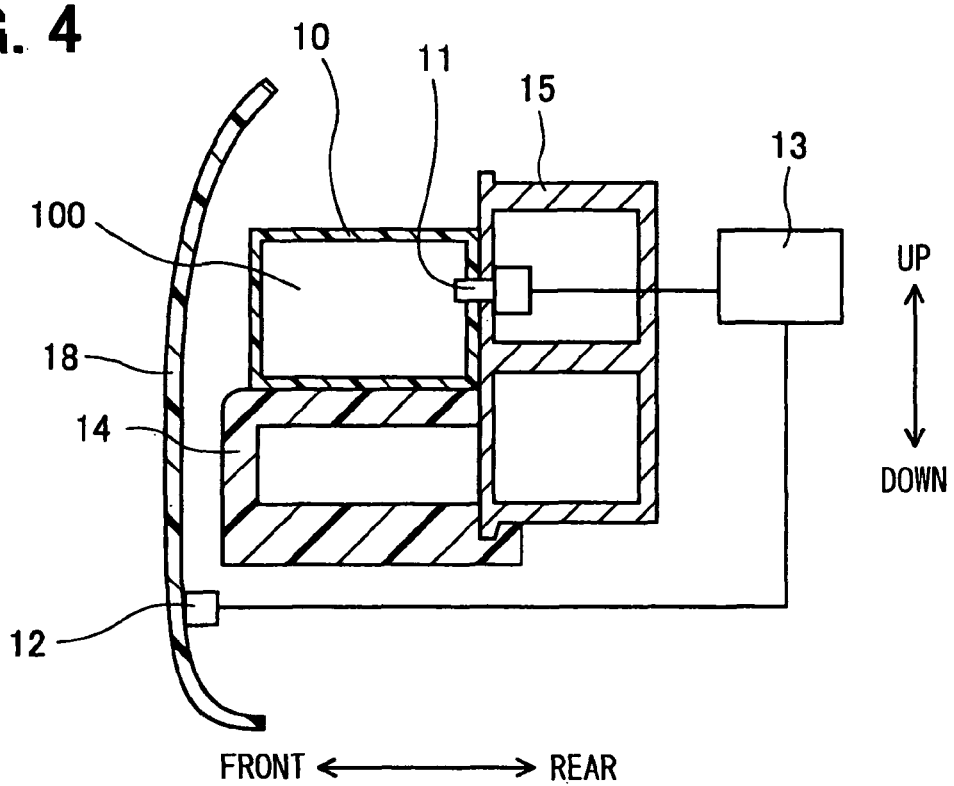
FIG. 4 is a cross sectional view showing a bumper reinforcement, a chamber member and a bumper absorber of the pedestrian collision detecting device according to a modification of the first embodiment.

The first embodiment shows the example that the temperature sensor 12 is attached to the bumper reinforcement 15. As shown in FIG. 4, the temperature sensor 12 may be arranged on a rear surface of the bumper cover 18 and at a periphery of a frontward corner portion of the bumper absorber 14. The temperature sensor 12 may be arranged at least one of the chamber member 10, bumper absorber 14, bumper reinforcement 15 and the bumper cover 18. A plurality of the temperature sensors may be arranged.

Furthermore, the first embodiment shows the example that the device 1 is arranged at a bumper which locates at the front side of the vehicle. The device 1 may be arranged at a bumper which locates at the rear side of the vehicle.

Second Embodiment

A pedestrian collision detecting device of a second embodiment is described. The second embodiment is a modification of the first embodiment with respect to the structures of the chamber member and the bumper absorber.

A structure of the pedestrian collision detecting device is described with reference to FIG. 5. In the second embodiment, a chamber member and a bumper absorber, which have different structures shown in the first embodiment, are described.

Figure 5:
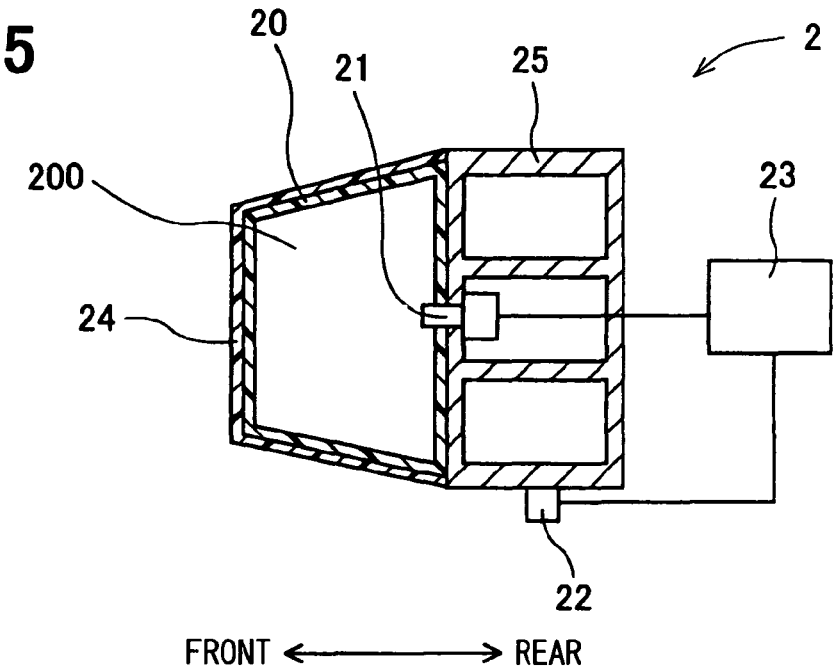
FIG. 5 is a cross sectional view showing a bumper reinforcement, a chamber member and a bumper absorber of a pedestrian collision detecting device according to a second embodiment.

As shown in FIG. 5, a pedestrian collision detecting device 2 (a collision detecting device) includes a chamber member 20, a pressure sensor 21, a temperature sensor 22, a pedestrian collision determination portion 23 (a determination means) and a bumper absorber 24. The chamber member 20 is an elongated sack-like member made of such as resin, which has a cross section of a square shape. The chamber member 20 is attached to a front surface of a bumper reinforcement 25 extending in a lateral direction of the vehicle. The bumper absorber 24 is an elongated plate shape member made of resin and has a cross section of a concave shape. The bumper absorber 24 is arranged at the front side of the bumper reinforcement 25 so as to cover the chamber member 20 and is attached to the bumper reinforcement 25.

The difference between the device 2 of the second embodiment and the device 1 of the first embodiment is an arrangement of the chamber member and the bumper absorber. The device 2 can obtain the same effect with the device 1.

Figure 6:
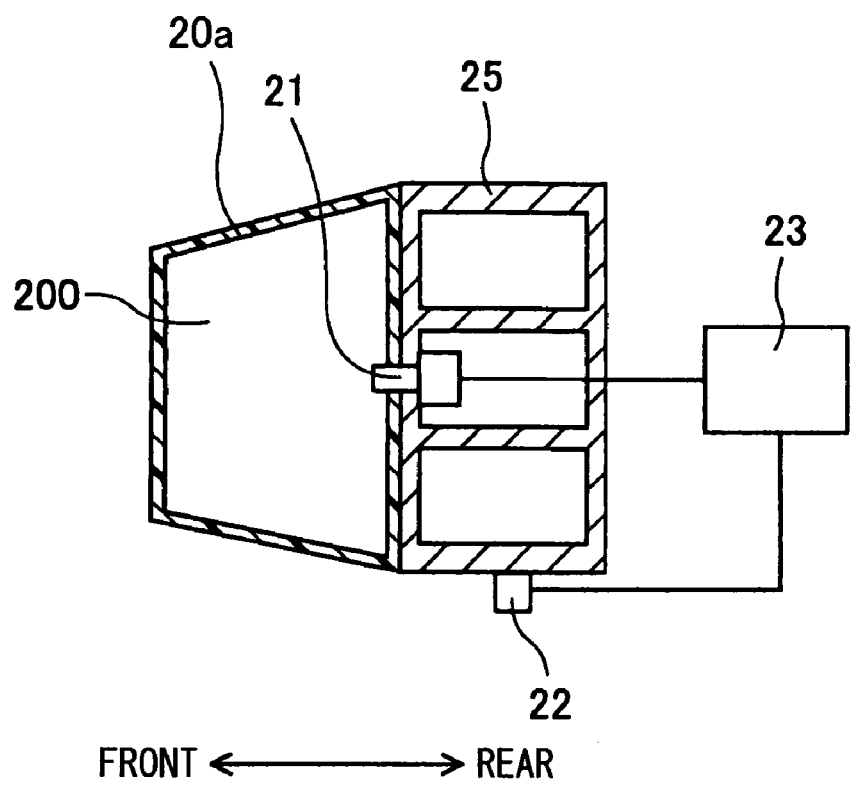
FIG. 6 is a cross sectional view showing a bumper reinforcement, a chamber member and a bumper absorber of the pedestrian collision detecting device according to a modification of the second embodiment.

It is noted that the second embodiment shows that the bumper absorber 24 is arranged so as to cover the chamber member 20. However, the bumper absorber 24 may be combined in the chamber member 20. As shown in FIG. 6, a chamber member 20a having a function of a bumper absorber may be used.

In addition, the second embodiment shows that the device 2 is arranged at a bumper which locates at the front side of the vehicle. However, the device 2 may be arranged at a bumper which locates at the rear side of the vehicle. The same effect can be obtained in this case.

Furthermore, the first and second embodiments show that each of the bumper absorbers 14 and 24 is made of resin. However, each of the bumper absorbers 14 and 24 may be made of metal as an example, in particular, sheet metal.

The first and second embodiments show that each of the determination portions 13 and 23 determines based on the detection results of each of the pressure sensors 11 and 21. However, as above described, each of the determination portions 13 and 23 may determine based on the detection results of the pressure sensor and the velocity sensor.

While the invention has been described with reference to preferred embodiments thereof, it is to be understood that the invention is not limited to the preferred embodiments. and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A collision detecting device for a vehicle comprising:
   a chamber member providing a space;
   a pressure sensor for detecting a pressure inside the space, and connected to the chamber member;
   a determination means for determining collision of an object with the vehicle based on the pressure of the space detected by the pressure sensor;
   a bumper absorber for absorbing an impact generated by the collision;
   a temperature sensor disposed around the chamber member or the bumper absorber to detect a temperature thereof, wherein the temperature sensor is located outside the chamber member and is disposed to a rear side of the bumper absorber; and a bumper reinforcement, wherein the bumper reinforcement is arranged at a rear side of the chamber member and the bumper absorber, and wherein the temperature sensor is arranged on a bottom of the bumper reinforcement, wherein the determination means corrects the detected pressure based on the temperature detected by the temperature sensor so as to be decreased when the detected temperature is higher than a predetermined upper limit temperature and so as to be increased when the detected temperature is lower than a predetermined lower limit temperature, and wherein the collision is determined based on the corrected pressure.

2. The collision detecting device according to claim 1, wherein at least one of the chamber member and the bumper absorber is made of resin.

3. The collision detecting device according to claim 1 further comprising a bumper cover,
wherein the bumper cover is arranged at a front side of the chamber member and the bumper absorber so that the bumper cover covers the front side of the chamber member and the bumper absorber, and
wherein the temperature sensor is arranged on at least one of the chamber member, the bumper absorber, the bumper reinforcement and the bumper cover.

4. The collision detecting device according to claim 1, wherein the determination means determines based on the detected pressure whether the collided object is a pedestrian.

5. The collision detecting device according to claim 1, wherein the pressure of the space detected by the pressure sensor is a pressure of air filled in the space.

6. The collision detecting device according to claim 1, wherein a pressure change in the space due to a deformation by the collision is detected by the pressure sensor.

7. The collision detecting device according to claim 1, wherein the bumper absorber is arranged on a bottom of the chamber member, and
wherein the pressure sensor is partially arranged in the chamber member.

8. A collision detecting device for a vehicle comprising:
a chamber member providing a space;
a pressure sensor for detecting a pressure inside the space, and connected to the chamber member;
a determination means for determining collision of an object with the vehicle based on the pressure of the space detected by the pressure sensor;
a bumper absorber for absorbing an impact generated by the collision;
a temperature sensor disposed around the chamber member or the bumper absorber to detect a temperature thereof, wherein the temperature sensor is located outside the chamber member and is disposed to a rear side of the bumper absorber; and
a bumper reinforcement, wherein the bumper reinforcement is arranged at a rear side of the chamber member and the bumper absorber, and wherein the temperature sensor is arranged on a bottom of the bumper reinforcement, wherein the determination means performs calculation based on the detected pressure detected by the pressure sensor so that a calculated pressure is obtained, wherein the determination means corrects a threshold pressure based on the detected temperature detected by the temperature sensor, and wherein the collision is determined based on a comparison between the calculated pressure and the corrected threshold pressure.

9. The collision detecting device according to claim 8, wherein at least one of the chamber member and the bumper absorber is made of resin.

10. The collision detecting device according to claim 8 further comprising a bumper cover,
wherein the bumper cover is arranged at a front side of the chamber member and the bumper absorber so that the bumper cover covers the front side of the chamber member and the bumper absorber, and
wherein the temperature sensor is arranged on at least one of the chamber member, the bumper absorber, the bumper reinforcement and the bumper cover.

11. The collision detecting device according to claim 8, wherein the determination means determines based on the detected pressure whether the collided object is a pedestrian.

12. The collision detecting device according to claim 8, wherein the calculated pressure is overestimated with increasing the temperature, and
wherein the determination means corrects to increase the threshold pressure when the detected temperature is higher than a predetermined upper limit temperature and the determination means corrects to decrease the threshold pressure when the detected temperature is lower than a predetermined lower limit temperature.

13. The collision detecting device according to claim 12, wherein the chamber member becomes soft with increasing the temperature, or the bumper absorber becomes soft with increasing the temperature.

14. The collision detecting device according to claim 8, wherein the calculated pressure is underestimated with increasing the temperature, and
wherein the determination means corrects to decrease the threshold pressure when the detected temperature is higher than a predetermined upper limit temperature and the determination means corrects to increase the threshold pressure when the detected temperature is lower than a predetermined lower limit temperature.

15. The collision detecting device according to claim 8, wherein the pressure of the space detected by the pressure sensor is a pressure of air filled in the space.

16. The collision detecting device according to claim 8, wherein a pressure change in the space due to a deformation by the collision is detected by the pressure sensor.

17. The collision detecting device according to claim 8, wherein the bumper absorber is arranged on a bottom of the chamber member, and
wherein the pressure sensor is partially arranged in the chamber member.

* * * * *